United States Patent [19]
Long et al.

[11] Patent Number: 6,077,182
[45] Date of Patent: Jun. 20, 2000

[54] RELAY VALVE WITH LATCH AREA FOR CONTROLLING A FRICTION DEVICE

[75] Inventors: Charles Francis Long, Pittsboro; Phillip Franklin McCauley, Zionsville, both of Ind.

[73] Assignee: General Motors Corporation, Detroit, Mich.

[21] Appl. No.: 09/333,149

[22] Filed: Jun. 14, 1999

[51] Int. Cl.[7] .................................................. F16H 61/18
[52] U.S. Cl. .......................... 475/128; 477/125; 477/906
[58] Field of Search ........................... 475/16, 127, 128; 477/125, 131, 906

[56] References Cited

U.S. PATENT DOCUMENTS

| | | | |
|---|---|---|---|
| 4,070,927 | 1/1978 | Polak . | |
| 4,981,052 | 1/1991 | Gierer | 477/125 |
| 5,222,581 | 6/1993 | Paulsen | 475/116 |
| 5,437,204 | 8/1995 | Person | 477/125 |
| 5,601,506 | 2/1997 | Long et al. | 475/120 |
| 5,616,093 | 4/1997 | Long et al. | 475/120 |
| 5,682,792 | 11/1997 | Liesener et al. | 477/906 |

*Primary Examiner*—Sherry L. Estremsky
*Attorney, Agent, or Firm*—Dean L. Ellis

[57] ABSTRACT

A powertrain has a multi-speed transmission with an electro-hydraulic control system for establishing the operating conditions of the transmission. The control system has a plurality of shift or relay valves that are each alternatively positioned by a spring or a solenoid controlled pressure bias. One of the relay valves, which controls two friction devices, has a latching mechanism which will retain the valve in the pressure set condition until the pressure in one of the friction devices is decreased below a predetermined pressure. The latch mechanism will also serve to retain the transmission in a low forward ratio if an electrical discontinuance should occur when the transmission is conditioned for the low forward ratio. The control will also permit retention in the highest forward ratio if electrical discontinuance occurs during operation in this ratio. Following an engine shutdown and restart, the transmission can be selectively operated in a reverse ratio, a neutral condition or the third forward ratio.

4 Claims, 9 Drawing Sheets

RELAY VALVE WITH LATCH AREA FOR CONTROLLING A FRICTION DEVICE

TECHNICAL FIELD

This invention relates to control systems having relay valves for controlling the interchange of friction devices in a power transmission.

BACKGROUND OF THE INVENTION

Power transmissions, such as that shown in U.S. Pat. No. 4,070,927 issued to Polak an Jan. 31, 1978, have electro-hydraulic ratio interchange controls to establish the engagement and disengagement of the friction devices that control the drive ratio in the planetary gear set of the transmission. These control systems, such as those shown in U.S. Pat. Nos. 5,616,093 and 5,601,506 both issued to Long et al, incorporate relay valves to direct pressurized fluid to the oncoming friction device and to exhaust fluid from the off going friction device. In these control systems, two variable pressure solenoids are incorporated to control the fluid pressure in the friction devices during the ratio interchange.

The relay valves are solenoid operated mechanisms that have a spring set and a pressure set position. If the power to the solenoids is discontinued, the systems are designed to retain the fifth forward ratio if the transmission is in the fourth through sixth ratio and to retain the third forward ratio if third or lower has been established. The transmission control systems permit shifting to reverse after electrical discontinuance also. After an engine shut-down only the third, neutral and reverse conditions can be achieved. The control does not permit the establishment of the first ratio and therefore imposes some limits on the gradeability of the vehicle following an electrical discontinuance. In another control system, it is known to limit the transmission to five forward speeds such that one of the variable pressure valves can be used to provide a pressure bias for the system regulator during the fifth forward ratio.

SUMMARY OF THE INVENTION

It is an object of the present invention to provide an improved transmission control system for a five range automatic shifting transmission.

In one aspect of the present invention, a transmission control has a relay valve with differential area formed thereon which area is effective to prevent the overlap of two friction devices during the disengagement of one of the devices. In another aspect of the present invention, the differential area latches the relay valve in a pressure set position after the discontinuance of the solenoid pressure bias if an electrical discontinuance occurs.

In yet another aspect of the present invention, the differential area is pressurized in the lowest forward ratio and will retain this ratio, if an electrical discontinuance occurs, until the manual selector is shifted to neutral or reverse. In still another aspect of the present invention, the latch area bias will delay the valve from reaching the spring set position until the pressure in the off going friction device reaches a predetermined threshold.

DESCRIPTION OF AN EXEMPLARY EMBODIMENT

Figure 1:
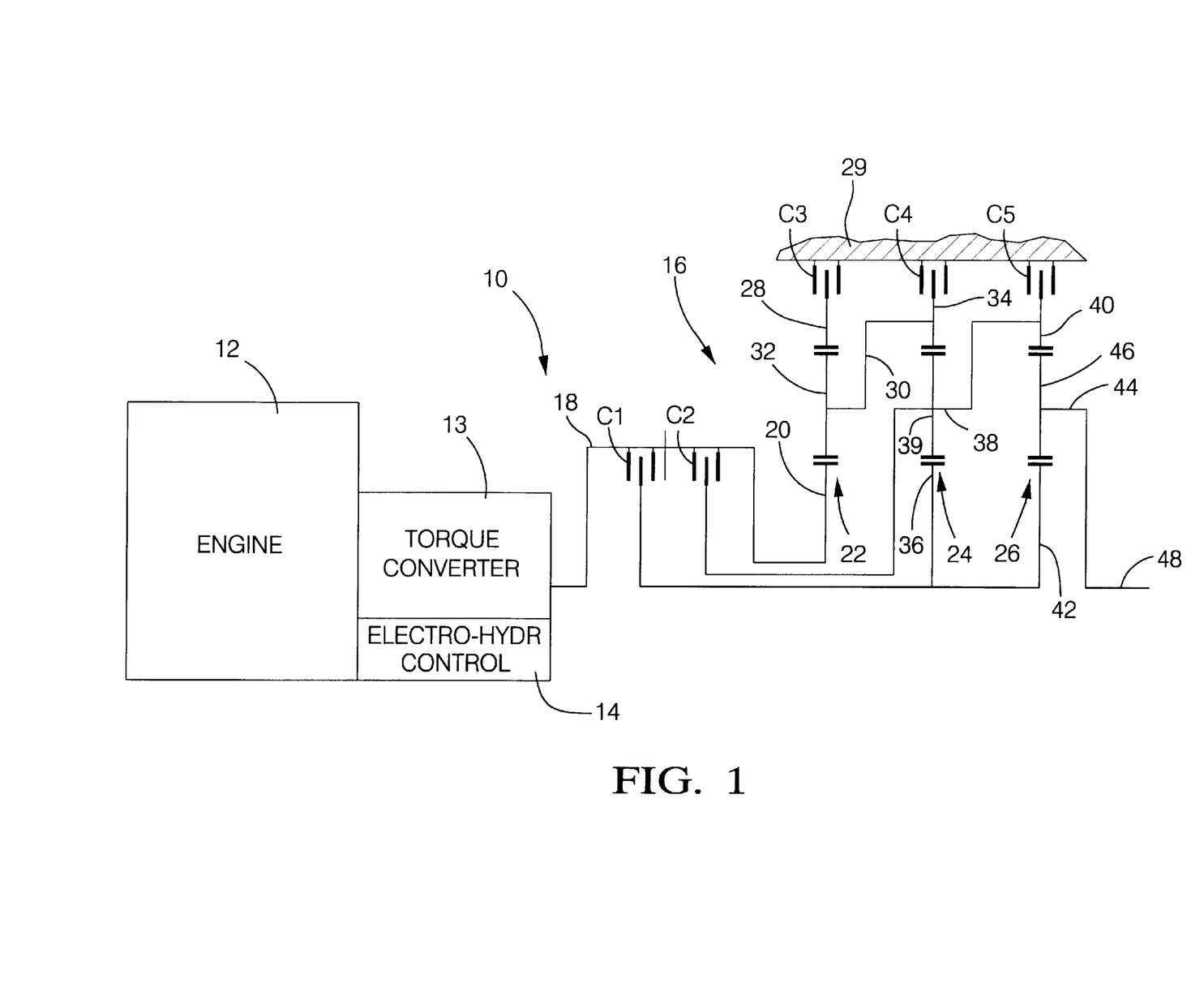
FIG. 1 is a schematic representation of a powertrain capable of using the present invention.

A powertrain 10, shown in FIG. 1, includes an engine 12, a torque converter 13, an electro-hydraulic control 14 and a multi-speed planetary transmission 16. The engine 12 and the torque converter 13 are conventional powertrain members. The planetary transmission 16 is preferably constructed in accordance with the teaching of U.S. Pat. No. 4,070,927 issued to Polak on Jan. 31, 1978.

The planetary transmission 16 includes an input hub 18 driven by the engine 12 through the torque converter 13. The hub 18 is continuously drivingly connected with a sun gear 20 which is a member of a first planetary gear set 22. The planetary transmission 16 also included planetary gear sets 24 and 26, a plurality of selectively engageable friction devices C1, C2, C3, C4 and C5. Devices C1 and C2 are conventional fluid operated friction clutches and the devices C3, C4 and C5 are conventional fluid operated friction brakes or, in the current engineering language, reaction clutches.

The planetary gear set 22 a ring gear member 28, which is selectively connectable with a transmission housing 29 through the friction device C3, and a planet carrier assembly 30 supporting pinion gears 32 that mesh with the sun gear 20 and the ring gear 28. The carrier assembly 30 is connected with a ring gear 34 of the planetary gear set 24 which also includes a sun gear 36 and a carrier assembly 38. Pinion gears 39 are rotatably mounted in the carrier assembly 38 and are disposed in meshing relation with the ring gear 34 and the sun gear 36. The ring gear 34 is selectively connectable with the housing 29 by the friction device C4. The carrier assembly 39 is selectively connectable with the hub 18 through the friction device C2 and also drivingly connected with a ring gear 40 of the planetary gear set 26.

The planetary gear set 26 also includes a sun gear 42 and a carrier assembly 44 that rotatably supports pinion gears 46 which are disposed in mesh with the sun gear 42 and the ring gear 40. The carrier assembly 44 is drivingly connected with a transmission output shaft 48. The ring gear member is selectively connectable with the transmission housing 29 by the friction device C5. The sun gear 42 and the sun gear 36 are interconnected for common rotation and are selectively connectable with the hub 18 by the friction device C1.

The planetary transmission 16 will provide five forward drive ratios, a neutral condition and a reverse drive ratio through the selective engagement of the friction devices C1, C2, C3, C4 and C5. The first and lowest forward speed ratio is established by the engagement of the friction devices C1 and C5. The ratio interchange from first to second is accomplished by the disengagement of C5 and the engagement of C4. The ratio interchange from second to third is accomplished by the disengagement of C4 and the engagement of C3. The ratio interchange from third to fourth is accomplished by the disengagement of C3 and the engagement of C2. The fifth forward ratio is accomplished by the disengagement of C1 and the engagement of C3. A sixth forward ratio is also available but is not utilized with the present control system.

A downshifting sequence is available by reversing the upshift sequence. This will, of course, be apparent to those skilled in the art. A neutral condition is provided by the disengagement of all of the friction devices, however for the best operating sequence the device C5 remains engaged during the neutral condition. The reverse ratio is established by the engagement of the devices C3 and C5. During the reverse ratio, the input drive is directly from the torque converter 13 through the hub 18 to the sun gear 20. The planetary gear set 24 provides the reversing function. A more complete description of the operation of this planetary transmission can be found in the above mentioned Polak Patent.

The electro-hydraulic control system 14 is shown in FIGS. 2 through 8 under various operating conditions. The control system 14 includes a conventional hydraulic pump 50 that draws fluid from a reservoir 52 for delivery to a main regulator valve 54 that returns excess fluid to the reservoir 52. The regulator valve 54 establishes the fluid maximum pressure in a main passage 56 of the control system 14. The passage 56 is connected with a control regulator valve 58 that establishes the pressure level in a passage 59 to be used by various solenoids and switches in the control system 14.

The control system 14 further includes three relay shift valves 60, 62 and 64, a manual selector valve 66, a torque converter clutch (TCC) valve 68 and an exhaust control valve 70. The exhaust control valve 70 is effective to establish minimum pressures in the friction devices C1, C2, C3, C4 and C5 in a well-known manner. The torque converter clutch valve 68 is controlled by a conventional solenoid control valve 72 to establish the engagement and disengagement of a conventional torque converter clutch 74. As is well-known torque converter clutches are disposed in the torque converter to provide a one to one drive through the torque converter at higher vehicle speeds to thereby improve the overall efficiency of the powertrain.

The manual selector valve 66 controls the distribution of hydraulic fluid to and from the friction devices C1 and C2 through a valve spool 76 which is moveable to a forward, neutral or reverse position. In the reverse and neutral positions, the friction devices C1 and C2 are exhausted through an exhaust passage 78 which communicates with the exhaust control valve 70. This maintains the pressure in the apply chambers of the friction devices at a substantially constant pressure such that the fill time during engagement is essentially constant.

The shift valve 60 has a spool valve 80 slidably disposed in a bore 82. The spool valve 80 is urged in one direction by a spring 83 and in the other direction by pressure in a chamber 84. The pressure in the chamber 84 is controlled by a selectively operable solenoid valve 86. The solenoid valve 86 uses a conventional on-off type solenoid. When the solenoid is off, the valve will be urged to the spring set position by the spring 83 and when the solenoid is on, the valve will be urged to the pressure set position by pressure in the chamber 84. The shift valve 60 is effective to control the distribution of fluid pressure from a proportional pressure control (PPC) regulator valve 88 and from the control passage 59. The regulator valve 88 includes a solenoid, not shown, that is preferably controlled by a conventional programmable digital computer, not shown, which is a component in the control 14. When the solenoid of the valve 88 is not energized, the output pressure of the valve 88 is exhausted.

The valve spool 80, in the spring set position, directs the fluid from the valve 88 to a passage 90 which communicates with the shift valve 64 and the control pressure in the passage 59 is distributed to a passage 92 that communicates with the shift valve 64. In the pressure set position, the valve spool 80 distributes the pressure from the valve 88 to a passage 94, which communicates with the shift valve 64, and distributes the fluid in the control passage 59 to a passage 96, which communicates with an electrical switch 98. When the switch 98 is energized, the control 14 is informed that the valve spool 80 has achieved the pressure set position. The shift valve 64 includes a valve spool 102 which is slidably disposed in a bore 104. The spool 102 is urged in one direction by a spring 106 to a spring set position and is urged in the other direction by fluid pressure in a chamber 108 to a pressure set position. Fluid pressure in the chamber 108 is controlled by an on/off solenoid valve 110 which is controlled by the computer in the control 14. The shift valve 64 controls distribution of fluid pressure in the main passage 56 and also controls the engagement and disengagement of the friction device C4. In the spring set position, the valve spool 102 distributes the pressure in main passage 56 to a passage 112 which communicates with the manual valve 66. In the forward position, the manual valve connects the passage 112 with the friction device C1. The valve 102 also communicates the passage 90 with the friction device C4.

When the shift valve 60 is in the spring set position, the regulator valve 88 will be operated to control the engagement and disengagement of the friction device C4. When the shift valve 64 is moved to the pressure set position, the valve spool 102 will distribute the pressure in passage 56 to a passage 116 that is in communication with the shift valve 62, and the passage 112 is communicated with the passage 94 which connection permits the proportional pressure valve 88 to control the pressure in the friction device C1 when the valve 60 is in the pressure set position. Also in the pressure set position, the valve spool 102 communicates the friction device C4 with a passage 118 which communicates with the spring 106 and, through the shift valve 62, with the passage 78 which connects the manual valve 66 and the exhaust control valve. This permits exhausting of the friction device C4 and ensures that the area of the spring 106 is exhausted. In the spring set position of the valve 64, the passage 118 communicates with a passage 120 which is connected with the shift valve 62.

The shift valve 62 has a stepped diameter valve spool 122 slidably disposed in a stepped diameter bore 124. The valve spool 122 has two valve lands 126 and 128 of equal diameter and three valve lands 130, 132 and 134 of equal diameter. The valve land 130 is larger than the adjacent land 128 such that a differential area is presented to a valley 136 between the lands 128 and 130. The shift valve 62 has a spring 138 that urges the valve spool 122 toward a spring set position, and a pressure chamber 140 which is controlled by a solenoid valve 142. When the chamber 140 is pressurized, the valve spool 122 is urged toward a pressure set position. When the shift valve 62 is directing fluid pressure to the friction device C5, the differential area between the lands 130 and 128 will be pressurized thus creating a pressure unbalance which will urge the valve spool 122 toward the pressure set position.

The shift valve 62 controls fluid flow to and from the friction devices C3 and C5 and the distribution of fluid from a pressure proportional control (PPC) valve 144. The PPC valve 144 is a normally open valve such that an output pressure is available whenever the valve is not electrically energized. The valve 144 is controlled by the digital computer in the control 14 to trim the friction devices C3 and C5 and to maintain one of them engaged during operation of the powertrain when the reverse, fifth, third or first ratio is requested. In the spring set position, the PPC valve 144 controls the pressure in the device C3 and in the pressure set position, the PPC valve 144 controls the pressure in the device C5. The valve 62 is in the pressure set position during the neutral condition and the first forward range and in the spring set position during all other operations.

The solenoid valves 72, 86, 110 and 142 are normally closed mechanisms such that they must be energized electrically to establish a control pressure. The PPC valves 88 and 144 use current proportional force motors to control the output pressure of the valves 88 and 144. The PPC valve 88 increases the output pressure thereof as the current thereto is increased. The PPC valve 144 decreases output pressure as the current thereto increases. The PPC valves 88 and 144 may, in the alternative, use duty cycle controlled solenoids. Both types of these variable pressure control devices are well-known. The use of the PPC valves 88 and 144 to control the engagement and disengagement of the friction devices is described more fully in U.S. Pat. No. 5,161,093 issued to Long et al on Apr. 1, 1997 and assigned to the assignee of this application.

Figure 2:
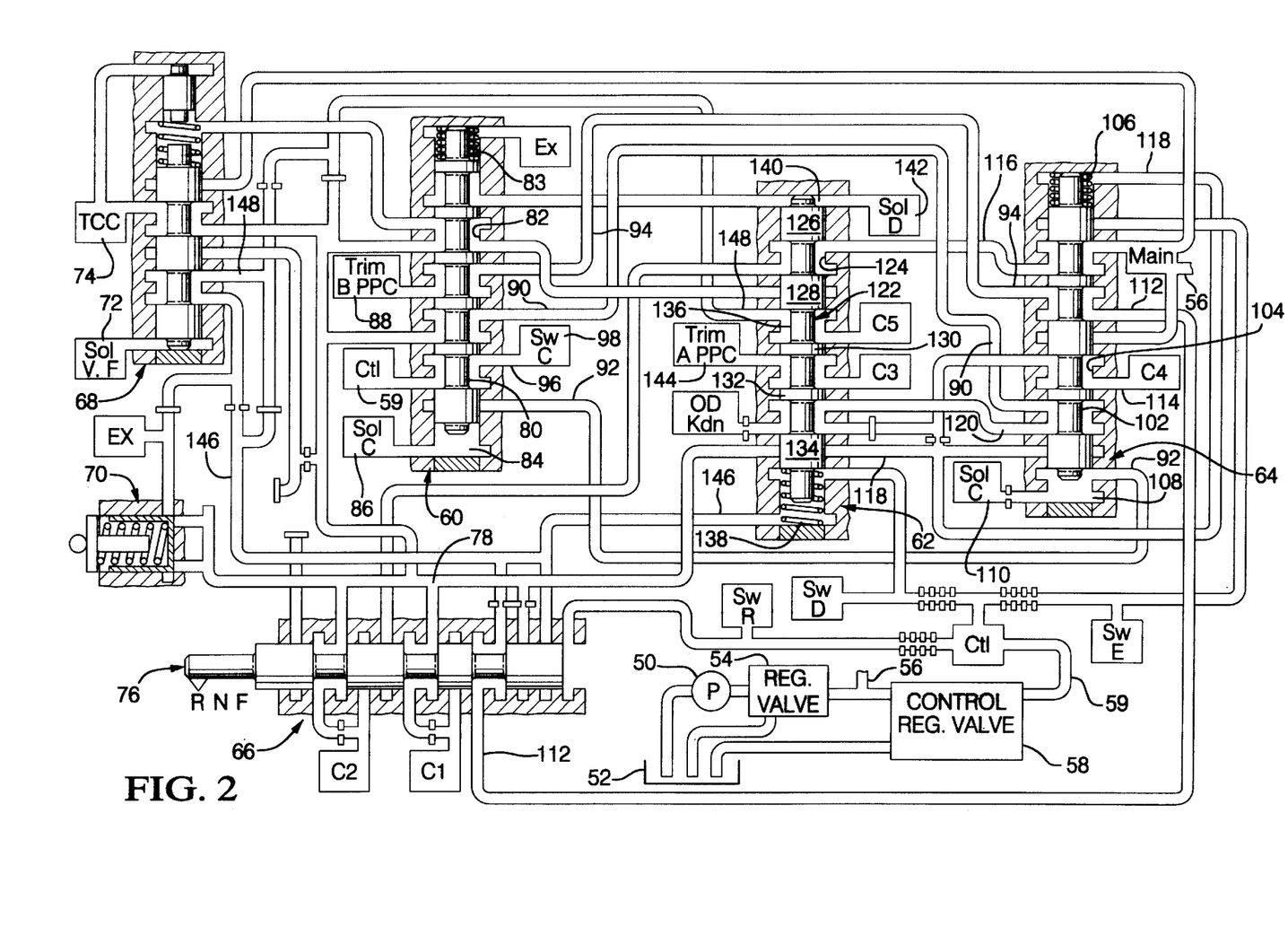
FIG. 2 is a diagrammatic representation of an electro-hydraulic control system incorporating the present invention with the valves conditioned for reverse.
Figure 3:
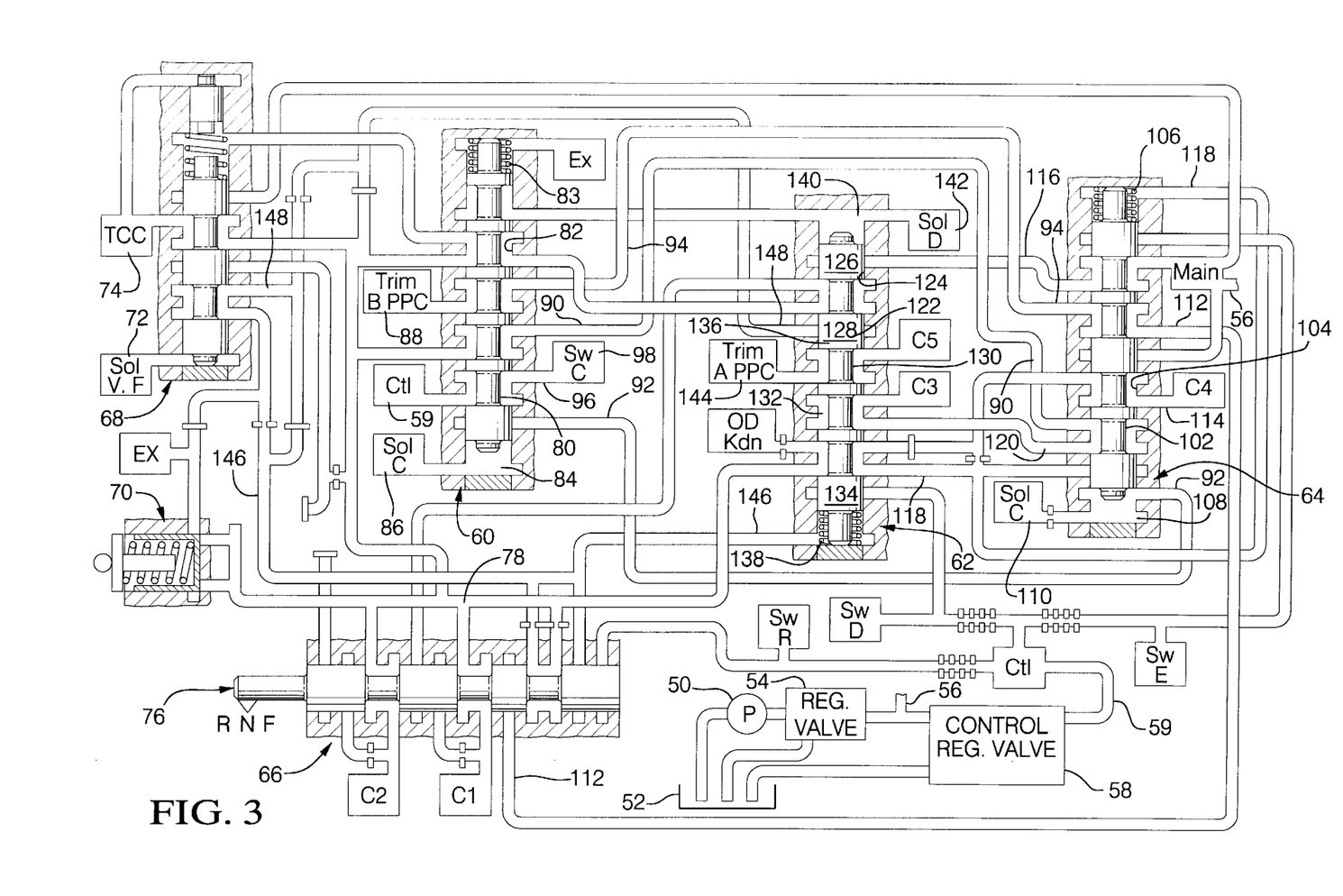
FIG. 3 is a diagrammatic representation of an electro-hydraulic control system incorporating the present invention with the valves conditioned for neutral.

FIGS. 2 through 8 describe the positioning of the shift valves 60, 62 and 64 during the various operating ranges or conditions of the planetary transmission 16. In FIG. 2, the transmission 16 is conditioned for reverse operation. The solenoid valve 86, the solenoid valve 142 and the solenoid valve 110 are on while the solenoid valve 142 is off. The PPC valve 88 is energized to provide fluid pressure at the shift valve 60. The PPC valve 144 is energized to control the output pressure thereof such that the friction device C3 is engaged in a controlled manner. The pressure from the PPC valve 88 is also routed through the shift valve 64 and the manual valve 66 to supply pressure to the area of the spring 138 such that the shift valve 62 is moved to the spring set position even though the solenoid valve 142 is energized.

The friction device C3 is engaged by pressure from the PPC valve 144 and the friction device C5 is engaged by pressure from the PPC valve 88. The fluid from the PPC valve 88 is directed through the shift valve 60, the shift valve 64, and the manual valve 66. From the manual valve 66, the pressure is routed through a passage 146 to the area of the spring 138 and to the TCC valve 68. From the TCC valve 68, the fluid pressure is directed through a passage 148 to the shift valve 62 which directs the fluid to the friction device C5. Since the area of the spring 138 is pressurized, a bias toward the spring set position is created which is greater than the bias created by the pressure acting on the differential area between the lands 130 and 128. Thus the shift valve 62 is maintained in the spring set position in opposition to the pressure bias created by the differential area.

Figure 8:
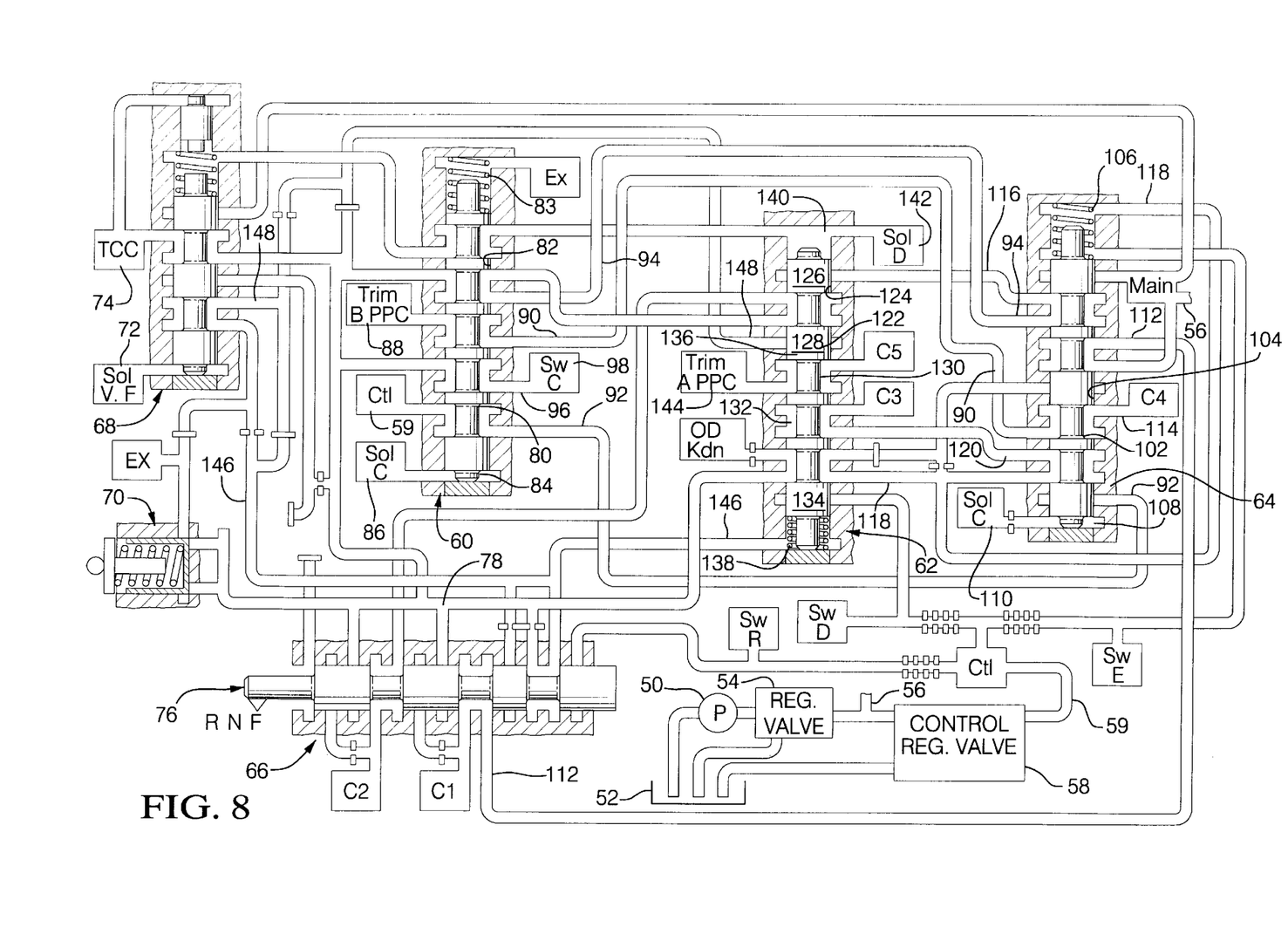
FIG. 8 is a diagrammatic representation of an electro-hydraulic control system incorporating the present invention with the valves conditioned for first forward ratio.

FIG. 8 describes the control system 14 when the transmission is conditioned for the first and lowest forward ratio. The solenoids 86 and 110 are off, the solenoid 142 is energized, the PPC valve 88 is off, and the PPC valve 144 is controlled to provide engagement of the friction device C5. The friction device C1 is engaged by main pressure in the passage 112. The pressure in the friction device C5 acts on the differential area between the lands 130 and 128 to establish a latching pressure which will continually urge the valve spool 122 to the pressure set position even if the solenoid 142 is turned off or electrical discontinuance occurs. Thus, the transmission will be retained in the first ratio if an electrical discontinuance occurs until the vehicle is brought to a stop and the manual valve is moved to the neutral position. This will accommodate discontinuance of the solenoid function when the vehicle is operating in the first ratio on an upgrade. Note that during an electrical discontinuance, the PPC valve 144 will have maximum pressure output. During the first ratio operation, the friction device C3 is exhausted through the shift valve 64, the passage 118, the shift valve 62 and the passage 78.

After an electrical discontinuance and the manual valve 66 is moved to neutral, the operator can select reverse and the third forward ratio when the engine is running. This will provide "limp home" capabilities in the event the electrical system or the control 14 does not continue to function properly.

Figure 4:
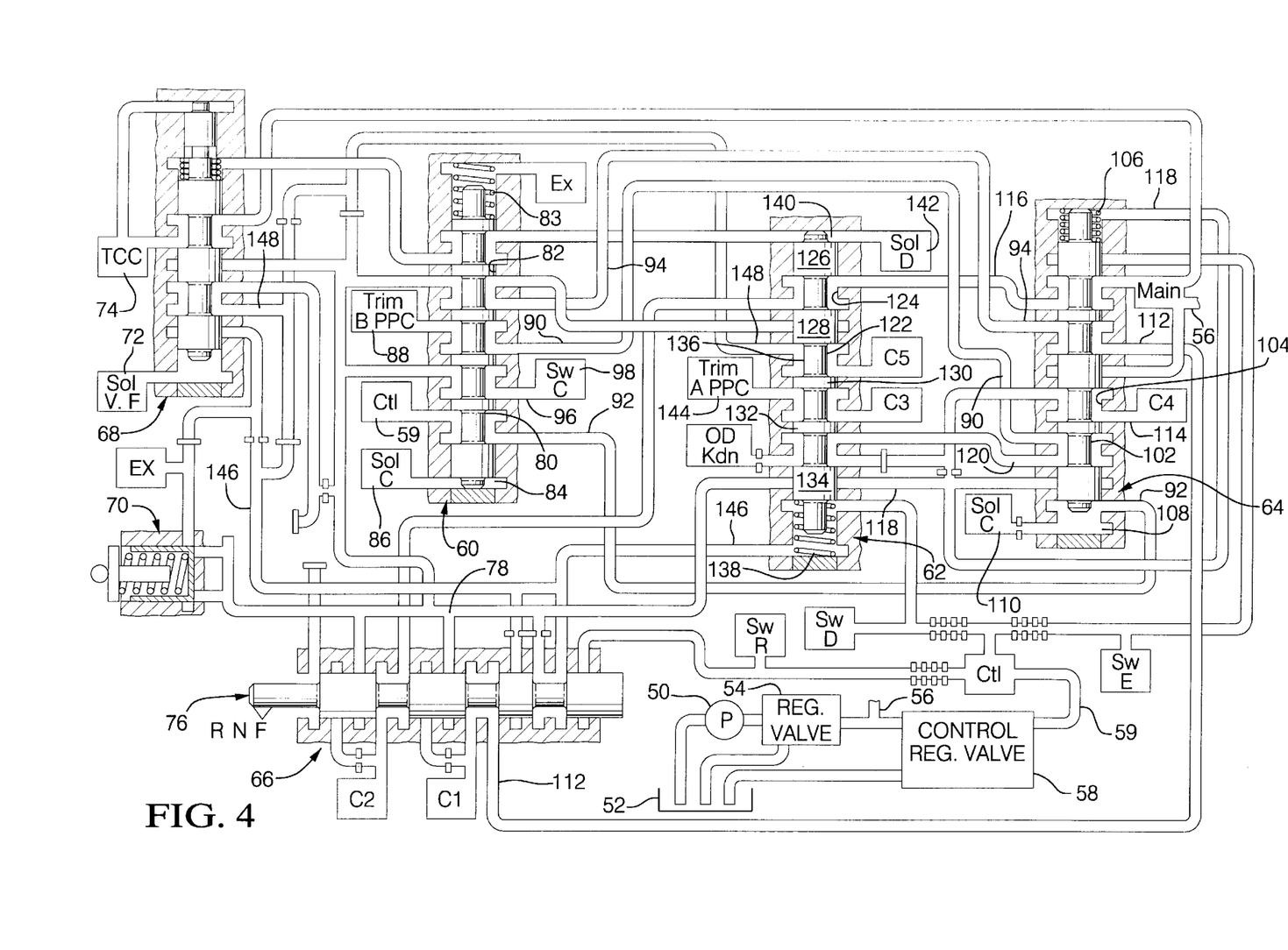
FIG. 4 is a diagrammatic representation of an electro-hydraulic control system incorporating the present invention with the valves conditioned for the fifth forward ratio.
Figure 5:
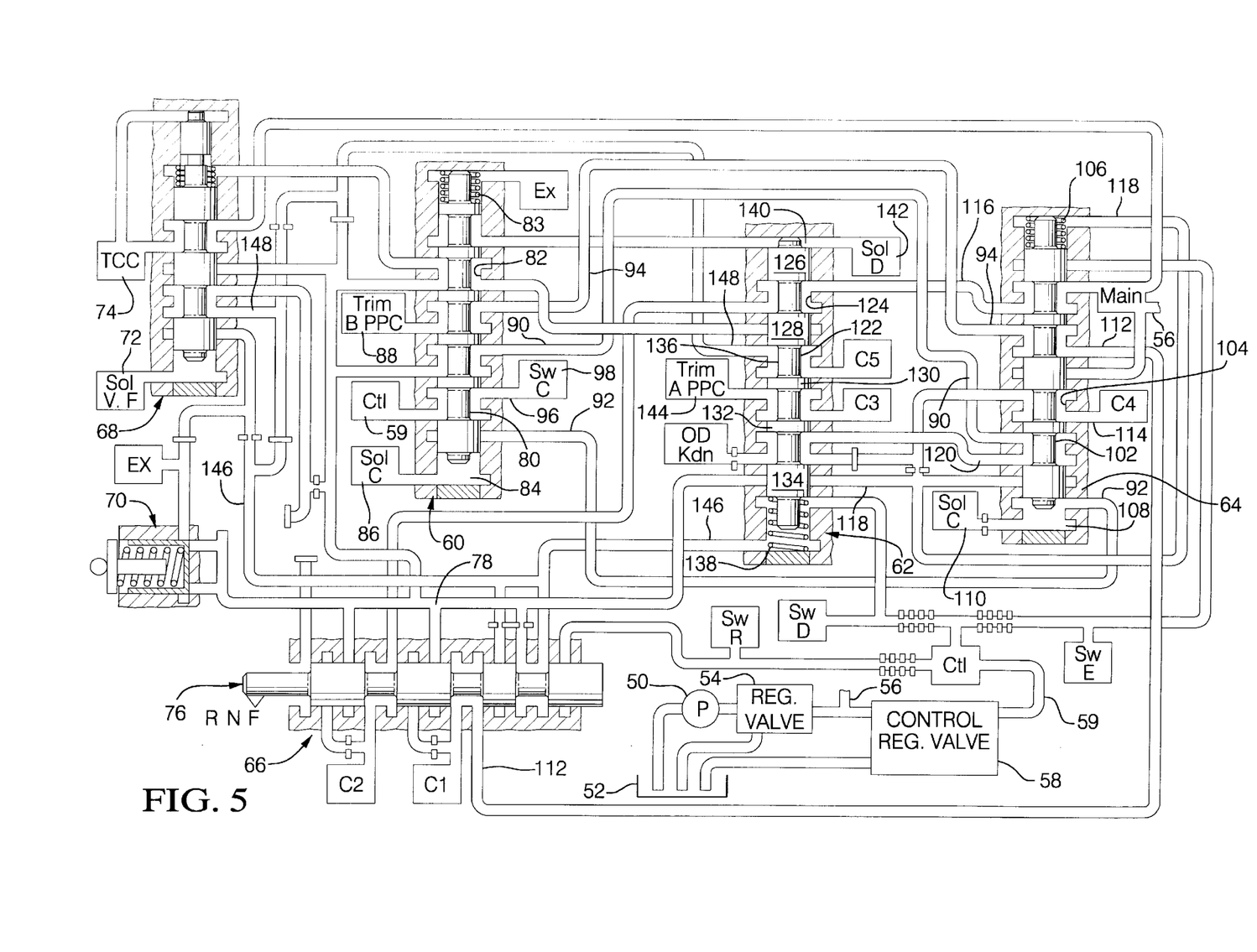
FIG. 5 is a diagrammatic representation of an electro-hydraulic control system incorporating the present invention with the valves conditioned for the fourth forward ratio.
Figure 6:
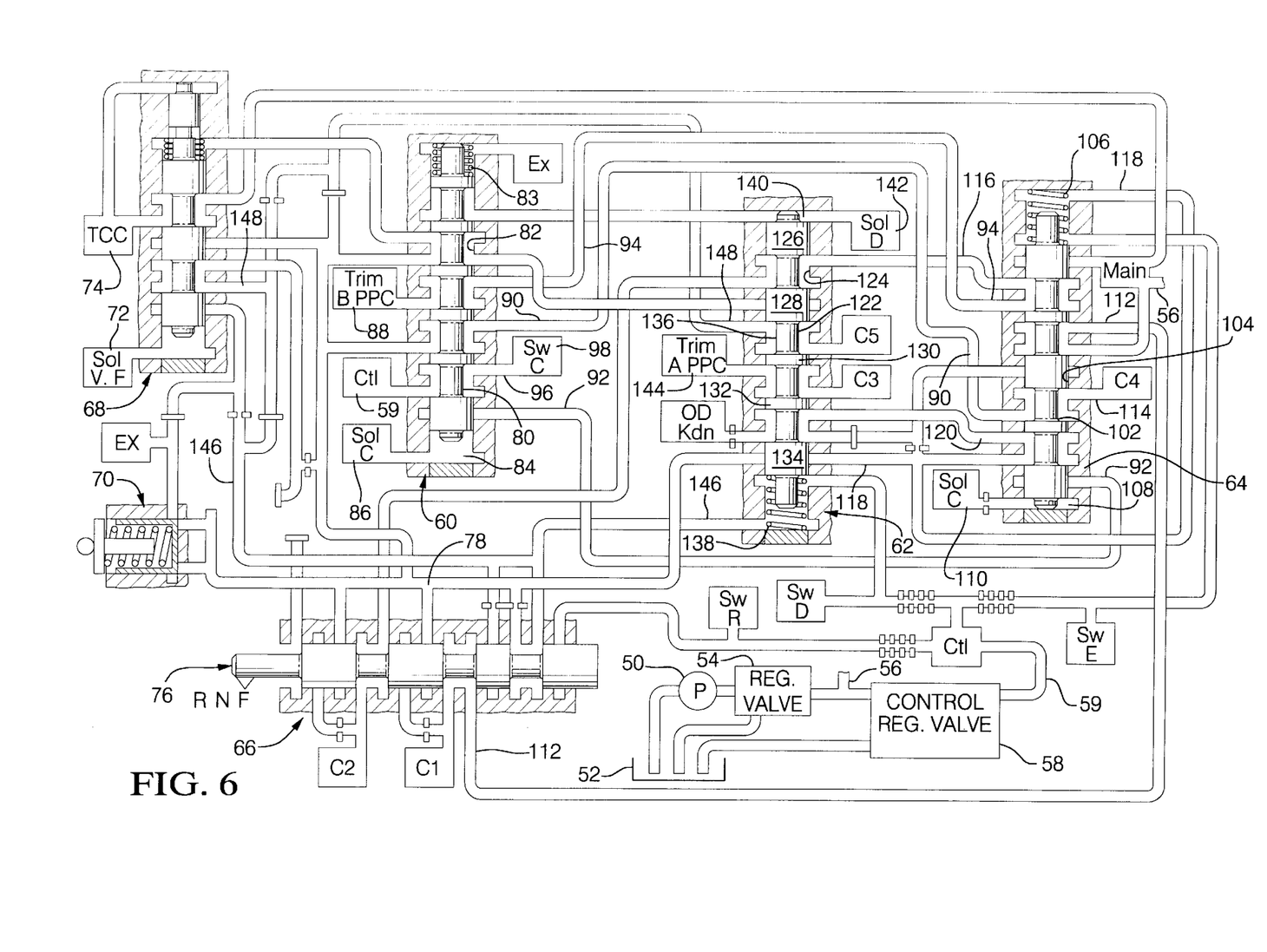
FIG. 6 is a diagrammatic representation of an electro-hydraulic control system incorporating the present invention with the valves conditioned for the third forward ratio.
Figure 7:
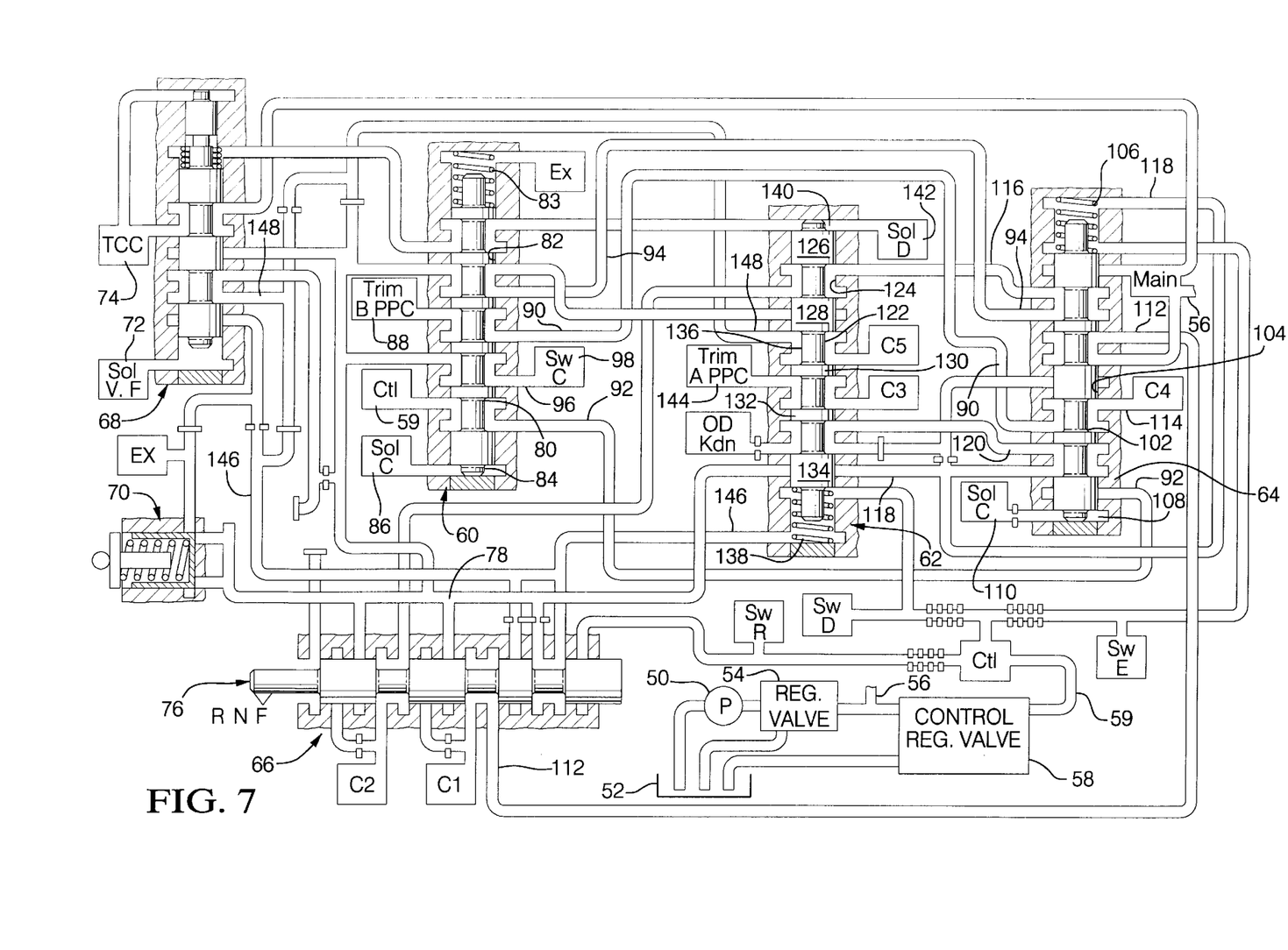
FIG. 7 is a diagrammatic representation of an electro-hydraulic control system incorporating the present invention with the valves conditioned for the second forward ratio.

During the fifth forward ratio, the valves of the control system 14 are positioned as shown in FIG. 4. The solenoids 86 and 142 are off, the solenoid 110 is on, the PPC valve 144 provides maximum pressure and the PPC valve 88 provides minimum pressure. The friction device C2 is engaged by main pressure through the shift valves 64 and 62, and the friction device C3 is pressurized by the PPC valve 144. The chamber 108 at valve 64 is also communicating with the control pressure is the passage 59 through the shift valve 60. Thus if an electrical discontinuance occurs when the transmission is in the fifth forward ratio, this ratio will be maintained until the engine operation is discontinued threrby reducing the pressure in the system. This will permit the vehicle to continue to operate at highway speeds without an unexpected downshift to the third range.

The latching feature established by the differential area between the lands 130 and 128 will provide an additional benefit over the first ratio latch. The latch feature will delay the engagement of the friction device C3 until the friction device C5 has diminished in capacity such that an overlap of these friction devices will not occur during a first to second ratio interchange. It will be noted in FIG. 7 when the second ratio is attained, the friction device C3 is disengaged since the PPC valve 144 has minimum pressure output. The disengagement of the friction device C5 is controlled by selectively decaying the pressure output of the PPC valve 144.

Figure 9:
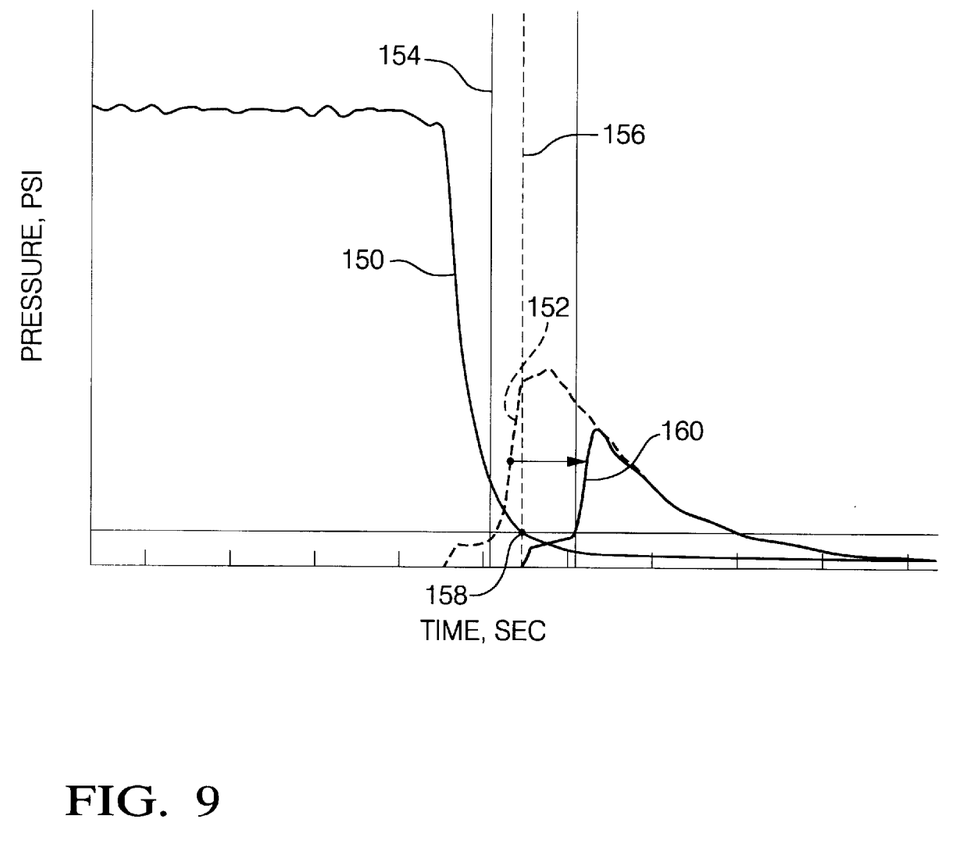
FIG. 9 depicts a plurality of operating curves for elements in the control system and the powertrain.

As seen in FIG. 9, the pressure at the friction device C5 will decay along the line 150 to achieve disengagement thereof as the pressure from the PPC valve 144 decays. If the shift valve 62 were to be spring set immediately upon the discontinuance of a pressure bias in the chamber 140, the friction device C3 could be pressurized along the dashed line 152 resulting in both friction devices C5 and C3 having torque capacity between the vertical lines 154 and 156. This result could cause a tie-up of the friction devices resulting in a harsh shift feel.

As is well-known, the friction devices have a fluid operated piston which enforces engagement the friction elements. Disengagement of the friction elements is caused by return springs acting on the piston in opposition to the pressure apply force. The friction device will not have any torque capacity until the apply pressure is high enough to overcome the return springs. By designing the latch force and the friction device C5 return spring force to be equal, the friction device C3 cannot be engaged until the pressure in the C5 device has decayed to the unlatch point 158 where the line 150 crosses the line 156. At this point, the torque capacity of the friction device C5 is virtually zero or at least less than any significant amount. This results in the friction device C3 fill curve being delayed as represented by the line 160 until the friction device C5 has very limited if any torque capacity. An overlap in the opposite direction, that is the friction device C3 disengaging while the friction device C5 is attempting to engage, is not an issue since the volume of the apply piston of the friction device C5 is much larger than the apply piston of the friction device C3 resulting in a much longer required fill time to begin piston movement.

It should be noted that the overlap condition can only occur while the shift valve 62 is moving to the spring set position and the friction device C5 is being disengaged. This occurs during a first to second interchange and a neutral to reverse manual shift. Since the friction device C3 is not operative in the second ratio, the apply delay is of no consequence. During a neutral (FIG. 3) to reverse (FIG. 2), the variable pressure output from the PPC valve 88 is directed through shift valve 60 to passage 94, through the shift valve 64 to passage 112, and through the manual valve 66 to passage 146 and the area of the spring 138. Pressure in this area will overcome the pressure bias on the differential area causing the shift valve 26 to assume the spring set position.

The only other time at which a conflict might occur is during a first to third skip shift. Under this condition, the delay of the oncoming friction device C3 is also not material since a longer shift time is expected during this low throttle condition. The use of the latching area on the shift valve 62 reduces the software commands needed to prevent the overlap which might inadvertently occur. This is more economical in the original design cost and saves space in the computer program which controls the ratio interchanges.

What is claimed is:

1. A control system for a multi-ratio powertrain having a plurality of selectively engageable friction devices for selectively establishing a reverse ratio, a neutral condition and five forward drive ratios, said control comprising:

two control valves for selectively issuing variable pressure command signals;

a plurality of valves means for issuing shift command pressures a plurality of shift valves each having a spring set position and a pressure set position for controlling fluid distribution, said pressure set position being established by respective ones of said valve means, a first of said shift valves being effective in said pressure set position to deliver said command signal from a first of said control valves to a first of said friction devices to selectively engage said first friction device in the reverse ratio, the neutral condition and a first and lowest of the forward drive ratios, and being effective in said spring set position to deliver said command signal from said first control valve to a third of said friction devices which is selectively engaged in at least one forward drive ratio separated from said first forward drive ratio by at least a second of said forward drive ratios, said first shift valve having a differential area responsive to said command signal being issued to said first friction device during said first forward ratio to maintain said first shift valve in said pressure set position when said command pressure from said valve means is prematurely discontinued.

2. The control system defined in claim 1 further comprising:

said first friction device having a torque capacity proportional to the variable pressure command signal and said first shift valve being retained in said pressure set position by said pressure command signal acting on said differential area until said torque capacity of said first friction device is below a predetermined torque valve.

3. A control system for a multi-ratio powertrain having a plurality of friction devices which are selectively engaged in pairs to selectively provide a reverse ratio and five forward ratios, one of said friction devices being engaged in a neutral condition, a first of said friction devices being engaged during the reverse ratio, the neutral condition and a first and lowest of the forward ratios, a second of the friction devices being engaged during a second of said forward ratios, and a third of the friction devices being engaged during the reverse ratio, a third and a fifth forward ratio, said control comprising:

a source of fluid pressure;

a plurality of electrically actuated variable pressure output valves connected with said source;

a plurality of electrically actuated control valves;

first, second and third shift valves each having a spring set position and a pressure set position, said pressure set position of each shift valve being controlled by a respective one of said control valves;

said first of said shift valves being operable in said spring set position to control distribution of pressure from a first of said variable pressure output valves to the third friction device and in the pressure set position to control distribution of pressure from said first variable pressure output valve to the first friction device, a differential area formed on said first shift valve being subjected to the pressure in the first friction device during engagement thereof and being effective to delay movement of said first shift valve to said spring set position until the pressure level of the first friction device is reduced below a predetermined value to thereby prevent fluid distribution to said third friction device when said first friction device is being disengaged.

4. The control system defined in claim 3 further comprising:

said first variable pressure output valve being operable to have maximum pressure output when the electrical function is off, said first variable pressure output valve being operable to maintain pressure at said differential area in the event of the electrical function discontinues during first ratio operation of the powertrain to thereby retain the powertrain in the first ratio at least until the neutral condition is selected or the pressure source is discontinued.

\* \* \* \* \*